United States Patent
Payne et al.

(10) Patent No.: US 11,512,747 B2
(45) Date of Patent: Nov. 29, 2022

(54) BALANCED PISTON CLUTCH

(71) Applicant: CNH Industrial America LLC, New Holland, PA (US)

(72) Inventors: Daniel Payne, Westmont, IL (US); Filippo Bonacini, Modena (IT); Stefano Iannone, Anzola Dell'Emilia (IT); Enrico Sedoni, Modena (IT)

(73) Assignee: CNH Industrial America LLC, New Holland, PA (US)

( * ) Notice: Subject to any disclaimer, the term of this patent is extended or adjusted under 35 U.S.C. 154(b) by 338 days.

(21) Appl. No.: 16/738,689

(22) Filed: Jan. 9, 2020

(65) Prior Publication Data
US 2021/0215208 A1     Jul. 15, 2021

(51) Int. Cl.
| | |
|---|---|
| F16D 25/0638 | (2006.01) |
| F16D 48/02 | (2006.01) |
| F16D 125/16 | (2012.01) |
| F16D 129/02 | (2012.01) |
| F16D 125/06 | (2012.01) |
| F16D 127/08 | (2012.01) |

(52) U.S. Cl.
CPC ......... F16D 25/14 (2013.01); F16D 25/0638 (2013.01); *F16D 2125/06* (2013.01); *F16D 2125/16* (2013.01); *F16D 2127/085* (2013.01); *F16D 2129/02* (2013.01)

(58) Field of Classification Search
CPC .............................. F16D 13/52; F16D 25/0638
See application file for complete search history.

(56) References Cited

U.S. PATENT DOCUMENTS

| | | | |
|---|---|---|---|
| 4,741,422 A * | 5/1988 | Fuehrer | F16D 25/12 192/85.25 |
| 5,172,799 A | 12/1992 | Iijima et al. | |
| 7,040,474 B2 | 5/2006 | Pedersen et al. | |
| 7,140,481 B2 | 11/2006 | Hagenow | |
| 7,802,667 B2 | 9/2010 | Raszkowski et al. | |
| 8,714,326 B2 | 5/2014 | Braford et al. | |
| 8,875,859 B2 | 11/2014 | Kasuya et al. | |
| 9,194,496 B2 | 11/2015 | Pecak | |
| 9,958,018 B2 | 5/2018 | Azumai et al. | |

(Continued)

FOREIGN PATENT DOCUMENTS

| | | | |
|---|---|---|---|
| DE | 112009000295 T5 * | 1/2011 | ......... F16D 25/0638 |
| FR | 3 063 321 A1 | 8/2018 | |

(Continued)

OTHER PUBLICATIONS

JP2006342819 machine translation (Year: 2022).*

*Primary Examiner* — Stacey A Fluhart
(74) *Attorney, Agent, or Firm* — Rickard Demille; Rebecca Henkel

(57) ABSTRACT

A clutch assembly for a transmission of an agricultural work vehicle. The clutch assembly includes a housing, a clutch pack located within the housing, a piston chamber located within the housing, and a piston located within and slidable relative to the piston chamber. The piston is operably connected to the clutch pack for engaging and disengaging the clutch pack. The clutch assembly further includes a balance chamber that is located within the housing. The lower boundary wall of the balance chamber and the lower boundary wall of the piston chamber are radially separated from one another by a substantial distance.

18 Claims, 2 Drawing Sheets

(56) References Cited

U.S. PATENT DOCUMENTS

| | | | | |
|---|---|---|---|---|
| 2005/0072647 | A1* | 4/2005 | Schmidt | F16D 25/12 192/106 F |
| 2008/0023286 | A1 | 1/2008 | Matsumoto et al. | |
| 2018/0112726 | A1* | 4/2018 | Sparks | F16D 7/027 |

FOREIGN PATENT DOCUMENTS

| | | | | |
|---|---|---|---|---|
| JP | 2006342819 A | * | 12/2006 | F16D 13/648 |
| JP | 4978506 B2 | | 4/2012 | |

* cited by examiner

BALANCED PISTON CLUTCH

BACKGROUND OF THE INVENTION

The present invention pertains to a driveline of a vehicle and, more specifically, to a hydraulically operated clutch assembly for the driveline of a work vehicle.

A work vehicle, such as a large truck or tractor, generally includes a chassis, wheels and/or tracks supporting the chassis, an engine, such as a diesel engine, a transmission, and a drivetrain. The transmission may transmit the motive force, in various gear ratios, to the wheels through the drivetrain which may selectively couple the drive axles in order to operate the vehicle in one or more tractive, i.e., drive, configurations. Work vehicles typically run at or near the operational capacity of their engines due to the power demands required for earth moving and/or towing various implements. Hence, it is generally critical to rapidly shift between gears to maintain sufficient power at the wheels.

The transmission may include one or more clutch assemblies operably connected in between respective input and output shafts for switching between gears. A clutch assembly generally includes a housing, a clutch pack, springs or Belleville spring washers, a piston, and a sealed piston chamber. The piston has an annular body and an extension member which is selectively engageable with the clutch pack. The springs act against the piston, returning the piston away from the clutch pack when hydraulic piston pressure is reduced. In operation, the piston chamber, located behind the piston, is selectively pressurized with hydraulic fluid to engage or disengage the clutch. For example, to engage the clutch, the piston chamber may be filled with additional fluid to build pressure therein for overcoming the force of the springs and accordingly pushing the piston toward the clutch pack to compress the clutch pack. To disengage the clutch, the pressure within the piston chamber may be relieved and the springs may return the piston, i.e. push the piston away from the clutch pack, to decompress the clutch pack.

In an effort to decrease the time required to shift gears, the piston chamber may contain a certain amount of hydraulic fluid therein so that little to no fluid flow is required to sufficiently fill the piston chamber for moving the piston. Since the clutch assembly rotates with the shaft, the hydraulic fluid which remains in the piston chamber is subjected to a centrifugal force. This centrifugal force pushes the hydraulic fluid outwardly toward the outer perimeter of the piston chamber, which accordingly creates an axial force, i.e., a centrifugal head force that acts upon the piston. The centrifugal head force pushes the piston towards the clutch pack. Typically, the springs resist the centrifugal head force; however, if the centrifugal head force becomes greater than the return force of the springs then the clutch may undesirably engage or be prevented from disengaging. Thus, the maximum speed of the vehicle may be limited as a result of the centrifugal head force interfering with the operation of the piston clutch. To counteract the undesired effects of the centrifugal head force, the piston clutch may include stronger springs, a mechanical flywheel, or a balance chamber located on an opposite side of the piston. The stronger springs can withstand a greater centrifugal force; however, such springs directly reduce the capacity and efficiency of the clutch.

A piston clutch equipped with a balance chamber helps to reduce the effects of the centrifugal head force at the piston chamber by creating an opposing, albeit lessor, centrifugal force on an opposite side of the piston. The balance chamber is comprised of a shield that is sealed to the underside of the piston extension. The balance chamber may be filled with low pressure oil which, in a similar fashion to the fluid within the piston chamber, creates the opposing centrifugal force. In this regard, the centrifugal head force at the piston chamber may be partially negated such that the piston clutch is not undesirably engaged or prevented from being disengaged. As a result of the shield-to-piston connection, the outer diameter of the piston chamber is always larger than the outer diameter of the balance chamber. Hence, the centrifugal force of the balancing chamber may never be equal to or greater than the piston chamber centrifugal force.

What is needed in the art is a cost-effective and efficient balance chamber for more desirably balancing the centrifugal force in the piston chamber.

SUMMARY OF THE INVENTION

In one exemplary embodiment formed in accordance with the present invention, there is provided a clutch assembly for a transmission of an agricultural work vehicle. The clutch assembly includes a housing, a clutch pack located within the housing, a piston chamber located within the housing, a piston located within and slidable relative to the piston chamber, and a balance chamber. The piston is operably connected to the clutch pack for engaging and disengaging the clutch pack. The lower boundary wall of the balance chamber and the lower boundary wall of the piston chamber are radially separated from one another by a substantial distance. This distance allows the balance chamber to provide a greater balance force to counteract a centrifugal head force acting on the piston.

In another exemplary embodiment formed in accordance with the present invention, there is provided a clutch assembly for a transmission of an agricultural work vehicle. The clutch assembly includes a housing, a clutch pack located within the housing, a piston chamber located within the housing and including a lower boundary wall and an upper boundary wall, and a piston located within and slidable relative to the piston chamber. The piston is operably connected to the clutch pack for engaging and disengaging the clutch pack. The clutch assembly also includes a balance chamber located within the housing and including a lower boundary wall and an upper boundary wall. The lower boundary wall of the balance chamber and the lower boundary wall of the piston chamber are radially separated from one another by a substantial distance.

In yet another exemplary embodiment formed in accordance with the present invention, there is provided an agricultural work vehicle that includes a chassis and a transmission supported by the chassis. The transmission includes at least one clutch assembly. The at least one clutch assembly includes a housing, a clutch pack located within the housing, a piston chamber located within the housing and including a lower boundary wall and an upper boundary wall, and a piston located within and slidable relative to the piston chamber. The piston is operably connected to the clutch pack for engaging and disengaging the clutch pack. The at least one clutch assembly also includes a balance chamber located within the housing and including a lower boundary wall and an upper boundary wall. The lower boundary wall of the balance chamber and the lower boundary wall of the piston chamber being radially separated from one another by a substantial distance.

One possible advantage of the exemplary embodiment of the agricultural vehicle is that the balance chamber provides for a substantial balance force for counteracting a centrifugal head force acting on the piston as a result of an increased radial distance between the lower boundary walls of the piston chamber and the balance chamber.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
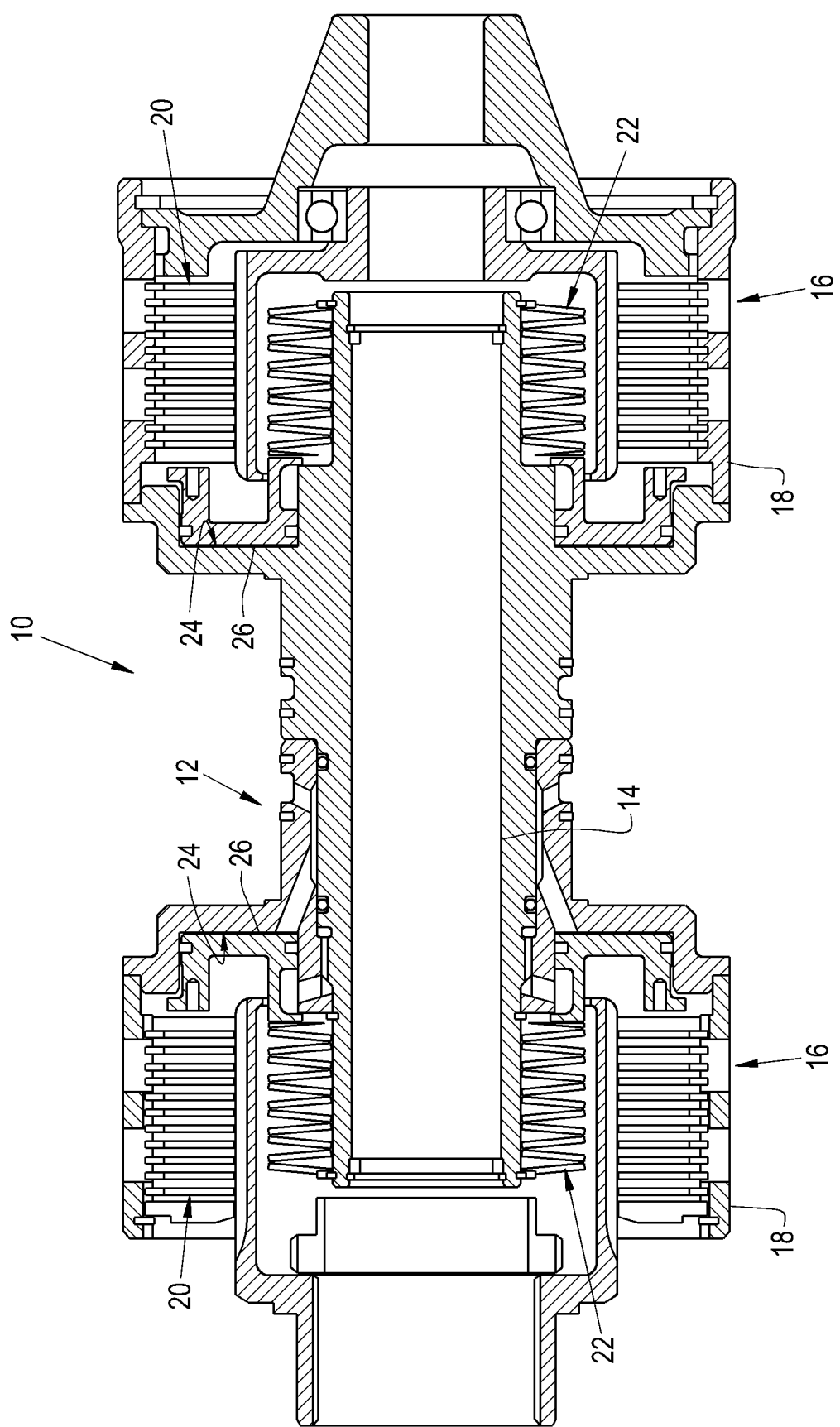
FIG. 1 illustrates a cross-sectional view of a known transmission for an agricultural work vehicle.

Referring now to the drawings, and more particularly to FIG. 1, there is shown an agricultural work vehicle 10 which generally includes a chassis, wheels and/or tracks supporting the chassis, an engine for providing motive power, a transmission 12, and a driveline for transferring the motive power to the wheels. The agricultural work vehicle 10 may be in the form of any desired work vehicle such as a tractor or windrower.

The transmission 12 is supported by the chassis and generally includes a shaft 14, two annular clutch assemblies 16, and a hydraulic system for operating the clutch assemblies 16 in order to cycle through the gears of the agricultural work vehicle 10. The transmission 12 is a continuously variable transmission (CVT). Each clutch assembly 16 may generally include a housing 18, a clutch pack 20, multiple Belleville spring washers 22, a piston chamber 24, and a piston 26 disposed within the piston chamber 24.

As each clutch assembly 16 spins along with the shaft 14, the fluid retained within the piston chamber 24 causes a centrifugal head force that acts upon the piston 26. Since the centrifugal head force is directly correlated to the rotational speed of the shaft 14, the centrifugal head force limits the maximum ground speed of the agricultural work vehicle 10. If the centrifugal head force becomes greater than the return spring force of the Belleville spring washers 22, then the centrifugal head force will cause the piston 26 to undesirably move or become immobilized, thus interfering with the operation of the clutch pack 20 and accordingly limiting the ground speed of the agricultural work vehicle 10.

Figure 2:
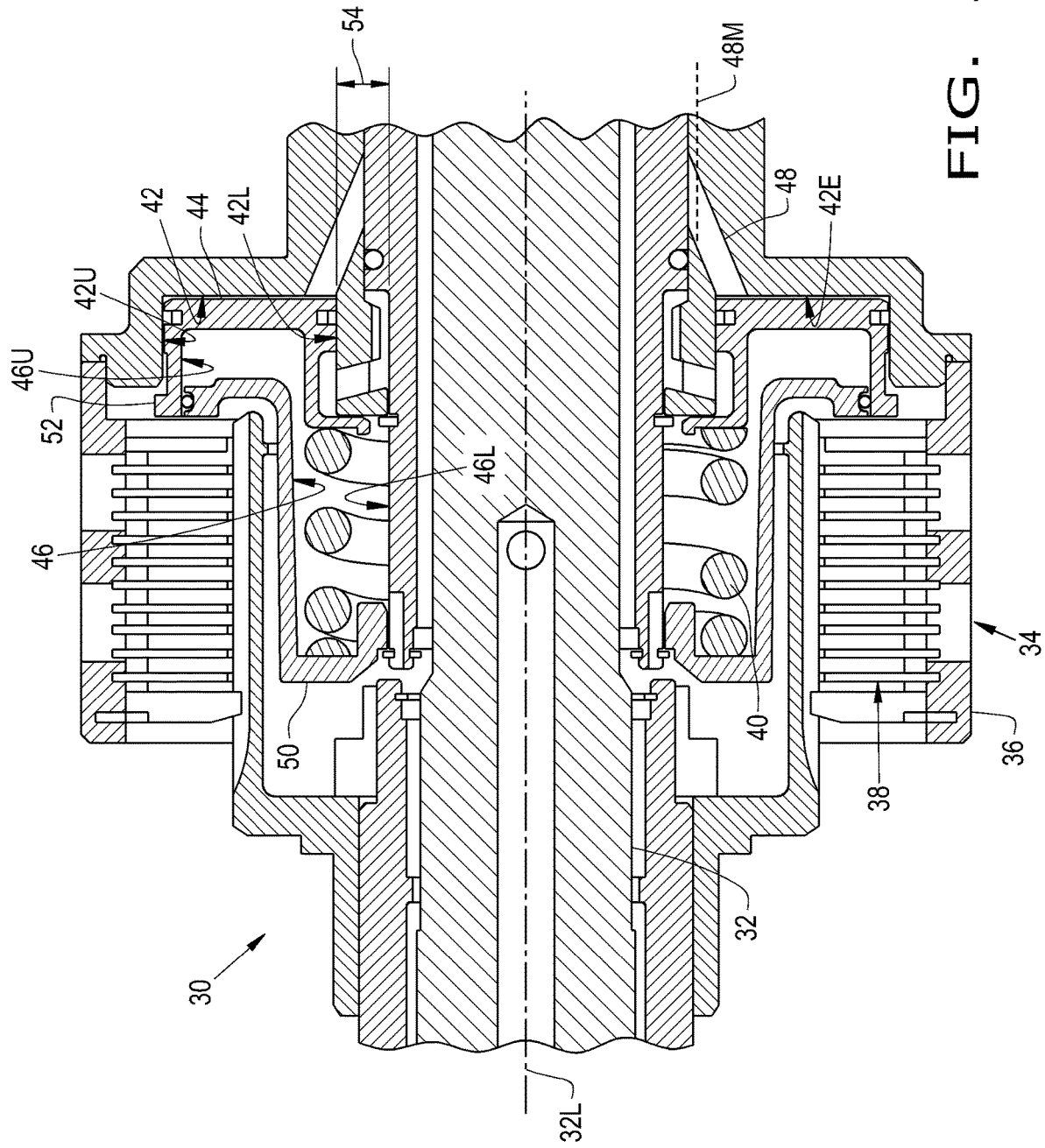
FIG. 2 illustrates a cross-sectional view of an exemplary embodiment of a transmission for an agricultural work vehicle, in accordance with an exemplary embodiment of the present invention.

Referring now to FIG. 2, there is shown a cross-sectional view of an exemplary embodiment of a transmission 30 according to the present invention. The transmission 30 may be incorporated into any desired work vehicle, such as the agricultural work vehicle 10 as described above. The transmission 30 is supported by the chassis of the agricultural work vehicle 10 and generally includes a shaft 32, one or more clutch assemblies 34, and a hydraulic system for hydraulically operating the clutch assemblies 34. The shaft 32 defines a longitudinal axis 32L and has an outer diameter. The transmission 30 may be in the form of a hydromechanical CVT transmission.

Each clutch assembly 34 may generally include a housing 36, a clutch pack 38, one or more biasing members 40, a piston chamber 42, a piston 44, and a balance chamber 46. Also, each clutch assembly 34 may further include a hydraulic inlet port 48 that is fluidly connected to the piston chamber 42.

The housing 36, e.g. clutch carrier, is connected to the shaft 32. For instance, the housing 36 and the shaft 32 may have corresponding splines which mate with one another such that the housing 36 rotates with the shaft 32. The housing 36 may comprise any desired shape and material.

The clutch pack 38 is located within the housing 36 and includes multiple clutch plates (unnumbered). The clutch plates may be selectively compressed together by the piston 44, which in turn causes the sets of plates to rotate together as one unit in order to engage a certain gear. Thus, when the clutch pack 38 is engaged, the corresponding gear will rotate with the shaft 32.

The one or more biasing members 40 are operably connected in between the clutch pack 38 and the piston 44. The one or more biasing members 40 may be positioned within a shield 50 which covers or shields the one or more biasing members 40. When the piston chamber 42 is not pressurized, the biasing member(s) 40 will push the piston 44 away from the clutch pack 38 back into its resting, disengaged position. Each biasing member 40 may be in the form of a coil spring 40. Due to the balance force supplied by the balance chamber 46, the coil spring(s) 40 may have a reduced or weaker coil strength or spring return force which in turn increases the capacity of the clutch pack 38 at 0 revolutions per minute (rpm). Thereby, the clutch assembly 34 may not need to include stronger biasing members, such as Belleville spring washers.

The piston chamber 42 is located within the housing 36. The piston chamber 42 has an annular configuration with an end wall 42E, a lower, i.e., inner, boundary wall 42L, and an upper, i.e., outer, boundary wall 42U. The end wall 42E is perpendicular to the longitudinal axis 32L of the shaft 32, and the lower and upper boundary walls 42L, 42U are parallel to the longitudinal axis 32L of the shaft 32. The lower boundary wall 42L defines an inner diameter of the piston chamber 42 relative to the longitudinal axis 32L of the shaft 32. The upper boundary wall 42U defines an outer diameter of the piston chamber 42 relative to the longitudinal axis 32L of the shaft 32.

The piston 44 is located within and slidable relative to the piston chamber 42. The piston 44 may include one or more sealing rings which sealably connect the piston 44 to the piston chamber 42. The piston 44 is also centered about the shaft 32. Furthermore, the piston 44 is operably connected to the clutch pack 38, by way of a piston extension 52, for selectively engaging and disengaging the clutch pack 38 as the piston 44 slides back and forth. When the piston chamber 42 is pressurized to a particular level, the piston 44 slides away from the end wall 42E of the piston chamber 42, overcomes the spring force of the one or more springs 40, and compresses the clutch pack 38. When the piston chamber 42 is depressurized, the piston 44 is overcome by the spring force, disengages or decompresses the clutch pack 38, and slides toward the end wall 42E of the piston chamber 42. The piston 44 may be in the form of an annular piston ring; however, the piston may be in the form of any desired piston.

The balance chamber 46 is located within the housing 36, opposite to the piston chamber 42. In other words, the piston and balance chambers 42, 46 are located on opposite sides of the piston 44. The balance chamber 46 is bounded by the shaft 32 and the shield 50, which is sealably connected in between the piston 44, e.g. piston extension 52, and the shaft 32. Hence, the outer diameter of the shaft 32 defines a lower boundary wall 46L of the balance chamber 46. As can be appreciated, a lower portion of the housing 36, which rests against the shaft 32, may instead define the lower boundary wall 46L of the balance chamber 46. Therefore, fluid may be captured within the balance chamber 46. The balance chamber 46 may include the lower, i.e., inner, boundary wall 46L, and an upper, i.e., outer, boundary wall 46U. The lower boundary wall 46L defines an inner diameter of the balance chamber 46 relative to the longitudinal axis 32L of the shaft 32. The upper boundary wall 46U defines an outer diameter of the balance chamber 46 relative to the longitudinal axis 32L of the shaft 32.

It is common to leave a sufficient amount of fluid within the piston chamber 42 in order to more quickly engage the clutch pack 38. However, as the housing 36 rotates with the shaft 32, the fluid within the piston chamber 42 applies a centrifugal head force onto the piston 44. The centrifugal head force accordingly pushes the piston 44 toward the clutch pack 38. Generally, under most operating conditions, the spring force is sufficient to counteract and overcome the centrifugal head force. Yet, the centrifugal head force may nevertheless limit the maximum velocity of the agricultural work vehicle 10. At the opposite side of the piston 44, fluid within the balance chamber 46 applies an opposing centrifugal force, i.e., balance force, which additionally helps to counteract the centrifugal head force acting within the piston chamber 42 and onto the piston 44. It should be appreciated that a pressure within the piston chamber 42 initially builds at a minimum pressure-building diameter 48M, which is indicative of a radial distance from the shaft 32 to a location within the inlet port 48 at which pressure initially builds. The minimum pressure-building diameter 48M is radially closer to the shaft 32 than the lower boundary wall 42L of the piston chamber 42.

The lower boundary wall 42L of the piston chamber 42 is radially separated from the lower boundary wall 46L of the balance chamber 42 by a substantial distance 54. As used herein, the term substantial difference may refer to a distance 54 of at least 20 mm (0.78 in.), plus or minus 10 mm. For example, the distance 54 may be approximately 21.75 mm (0.86 in.). The distance 54 causes the balance chamber 46 to provide a significantly greater balance force. Accordingly, the balance force may be at least 80 percent of the centrifugal force acting within the piston chamber 42. For instance, the balance force may be equal to or greater than the centrifugal force acting within the piston chamber 42.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A clutch assembly for a transmission of an agricultural work vehicle, comprising:
a housing;
a clutch pack located within the housing;
a piston chamber located within the housing and comprising a lower boundary wall and an upper boundary wall;
a piston located within and slidable relative to the piston chamber, and the piston being operably connected to the clutch pack for engaging and disengaging the clutch pack; and
a balance chamber located within the housing and comprising a lower boundary wall and an upper boundary wall, and the lower boundary wall of the balance chamber and the lower boundary wall of the piston chamber being radially separated from one another by a substantial distance, which is at least 20 mm (0.78 inches).

2. The clutch assembly of claim 1, wherein the piston chamber and the balance chamber are configured for being filled with a fluid, and the balance chamber is configured for providing a balance force for counteracting a centrifugal force acting within the piston chamber.

3. The clutch assembly of claim 2, wherein the balance force is at least 80 percent of the centrifugal force acting within the piston chamber.

4. The clutch assembly of claim 2, wherein the balance force is one of equal to and greater than the centrifugal force acting within the piston chamber.

5. The clutch assembly of claim 2, further comprising a shaft, about which the piston is centered upon, at least one biasing member coaxial with the shaft, and a shield sealably connected in between the piston and the shaft and configured for shielding the at least one biasing member.

6. The clutch assembly of claim 5, wherein the balance chamber is bounded by the shaft and the shield such that an outer diameter of the shaft defines the lower boundary wall of the balance chamber.

7. The clutch assembly of claim 5, further comprising an inlet port fluidly connected to the piston chamber, and wherein a pressure within the piston chamber initially builds at a minimum pressure-building diameter which is indicative of a radial distance from the shaft to a location within the inlet port at which pressure initially builds, and the minimum pressure-building diameter is radially closer to the shaft than the lower boundary wall of the piston chamber.

8. The clutch assembly of claim 5, wherein the at least one biasing member is in the form of at least one coil spring.

9. The clutch assembly of claim 8, wherein the at least one coil spring comprises a coil strength for increasing a capacity of the clutch pack at 0 revolutions per minute (rpm).

10. An agricultural work vehicle, comprising:
a chassis; and
a transmission supported by the chassis and comprising at least one clutch assembly, the at least one clutch assembly comprising:
a housing;
a clutch pack located within the housing;
a piston chamber located within the housing and comprising a lower boundary wall and an upper boundary wall;
a piston located within and slidable relative to the piston chamber, and the piston being operably connected to the clutch pack for engaging and disengaging the clutch pack; and
a balance chamber located within the housing and comprising a lower boundary wall and an upper boundary wall, and the lower boundary wall of the balance chamber and the lower boundary wall of the piston chamber being radially separated from one another by a substantial distance, which is at least 20 mm (0.78 inches).

11. The agricultural work vehicle of claim 10, wherein the piston chamber and the balance chamber are configured for being filled with a fluid, and the balance chamber is configured for providing a balance force for counteracting a centrifugal force acting within the piston chamber.

12. The agricultural work vehicle of claim 11, wherein the balance force is at least 80 percent of the centrifugal force acting within the piston chamber.

13. The agricultural work vehicle of claim 11, wherein the balance force is one of equal to and greater than the centrifugal force acting within the piston chamber.

14. The agricultural work vehicle of claim 11, further comprising a shaft, about which the piston is centered upon, at least one biasing member coaxial with the shaft, and a shield sealably connected in between the piston and the shaft and configured for shielding the at least one biasing member.

15. The agricultural work vehicle of claim 14, wherein the balance chamber is bounded by the shaft and the shield such that an outer diameter of the shaft defines the lower boundary wall of the balance chamber.

16. The agricultural work vehicle of claim 14, wherein the at least one clutch assembly further comprising an inlet port fluidly connected to the piston chamber, and wherein a pressure within the piston chamber initially builds at a minimum pressure-building diameter which is indicative of a radial distance from the shaft to a location within the inlet port at which pressure initially builds, and the minimum pressure-building diameter is radially closer to the shaft than the lower boundary wall of the piston chamber.

17. The agricultural work vehicle of claim 14, wherein the at least one biasing member is in the form of at least one coil spring.

18. The agricultural work vehicle of claim 17, wherein the at least one coil spring comprises a coil strength for increasing a capacity of the clutch pack at 0 revolutions per minute (rpm).

* * * * *